United States Patent [19]  [11] 3,731,663
Hollins  [45] May 8, 1973

[54] VEHICLE ENGINE FUEL CONTROL ACCELERATOR OVERRIDE

[76] Inventor: Jesse R. Hollins, One Chester Drive, Great Neck, N.Y. 11021

[22] Filed: Jan. 8, 1971

[21] Appl. No.: 104,990

[52] U.S. Cl.................123/98, 74/513, 123/198 DB, 180/82 NA, 192/.058
[51] Int. Cl..............................................F02d 11/02
[58] Field of Search..............123/98, 198 DB, 103 C, 123/103 E; 74/513, 482; 180/82 NA; 192/.058

[56] References Cited

UNITED STATES PATENTS

| | | | |
|---|---|---|---|
| 2,313,000 | 3/1942 | Haugueli | 192/.058 |
| 3,626,919 | 12/1971 | MacMillan | 123/198 DB |
| 2,358,597 | 9/1944 | Russell | 74/513 |
| 3,237,478 | 3/1966 | Jewell | 74/482 |
| 3,580,100 | 12/1969 | McDermott | 74/482 |

Primary Examiner—William F. O'Dea
Assistant Examiner—Randall Heald
Attorney—Kirschstein, Kirschstein, Ottinger & Frank

[57] ABSTRACT

Apparatus for controlling the position of an accelerator control element of a vehicular engine when the mechanism conventionally employed for moving the same has frozen. The apparatus includes a resilient member in a first kinematic train between said element and the accelerator pedal or like element usually employed by the vehicle operator to regulate the engine speed. The resilient member is connected to said element directly or through non-freezable components. A return resilient means which is substantially weaker than the resilient member biases the accelerator control element to an idle position. A second kinematic train is so arranged that when actuated by the vehicle operator it will positively move the accelerator control element toward its idling speed operating position. In normal use a force is applied through the first kinematic train and resilient member to move the accelerator control element in an engine speed-up direction while storing up energy in the return resilient means whereby as such force is reduced the engine speed will slow down. If the control element or any part of the first kinematic train is frozen the operator can, through the second kinematic train move the control element against the bias of the resilient member toward its idling speed operating position and in this manner either slow down the engine to idling speed or regulate it to any speed between idling and the speed corresponding to engine speed at which the first kinematic train was frozen. The resilient member is weak enough to be elastically deformed by the force applied by an operator through the second kinematic train.

16 Claims, 5 Drawing Figures

PATENTED MAY 8 1973

INVENTOR
JESSE R. HOLLINS

BY

ATTORNEYS

VEHICLE ENGINE FUEL CONTROL ACCELERATOR OVERRIDE

BACKGROUND OF THE INVENTION

1. Field of the Invention

Mechanism for controlling the position of an accelerator control arm in a vehicle having a frozen accelerator control linkage.

2. Description of the Prior Art

In recent years there have been serious problems with many vehicles as a result of sticking (freezing) in the accelerator control linkage. This problem arises when the accelerator control linkage which usually consists of rigid linkage elements or a shielded wire or cable becomes stuck, very often in a position which causes the accelerator control arm to maintain a high engine speed. It can readily be seen that as a result of this condition a safety hazard is presented. With a stuck accelerator control linkage the reduction of pressure on the accelerator pedal does not allow the accelerator control arm to return toward its engine idling speed operating position under the restoring bias of the return spring.

In the event of loss of accelerator control due to a frozen accelerator linkage, turning off of the ignition of a vehicle equipped with power steering and/or power brakes is dangerous and undesirable as it results in the immediate loss of the power steering and limited use of the power brakes. With the loss of the power steering the driver cannot steer the vehicle easily even though the vehicle may still be moving, and having limited use of the power brakes necessitates the need of increased foot pressure on the brake pedal to make the brakes operate even in a limited manner. Furthermore, if the engine has been operating at a high rate of speed, turning off the ignition often times causes the engine to operate on compression ignition and the engine will not cease to operate promptly.

As outlined in my U.S. Pat. No. 3,338,357 which issued on Aug. 29, 1967, it is extremely desirable that when the brakes of the vehicle are applied the accelerator control arm be automatically moved to its engine idling position regardless of whether the driver of the vehicle continues to depress the accelerator pedal. This is of course true even if the accelerator control linkage is frozen.

SUMMARY OF THE INVENTION

It is an object of the present invention to provide means for reducing the engine speed of a vehicle having a stuck accelerator control linkage.

Still another object of the present invention is to provide means for allowing the driver of a vehicle to control the operating speed of the vehicle engine and hence the speed of the vehicle when the accelerator control linkage is stuck in a position which causes the engine to operate at a higher than idling speed.

A still further object of the present invention is to provide a power-operated means for returning the accelerator control arm of an internal combustion engine to its engine idling operating position when the accelerator control linkage thereof is frozen in a position which causes the engine to operate at a higher than idling speed.

A still further object of the present invention is to provide a speed control system in a vehicle wherein the application of pressure to the brake pedal causes the accelerator control arm to move to an engine idle position even if the accelerator control linkage is frozen.

Still another object of the present invention is to provide a vehicle speed control system wherein the application of pressure to the brake pedal automatically by power means causes the accelerator control arm to move and reduce the operating speed of the engine to its idling speed even if the accelerator linkage is frozen or if the driver maintains foot pressure on the accelerator pedal.

Briefly, in accordance with the present invention, the foregoing and other objects are achieved by a control system for a vehicle engine having a force transmission spring connected to the accelerator control arm and forming part of an accelerator control kinematic train. The force transmission spring is arranged so that the application of a force to it causes the accelerator control arm to move in a direction to increase the operating speed of the engine.

A return spring is provided which is substantially weaker than the force transmission spring and is connected to the accelerator control arm so as to bias the accelerator control arm to a position wherein the engine will idle. The accelerator control arm includes a slot and an axially shiftable cable extends therethrough and under inoperative conditions slightly therepast with a stop (abutment) affixed to the end of the cable adjacent the arm. A lost motion is provided by the cable stop being spaced from the accelerator control arm even at the position of the control arm corresponding to maximum engine speed and much further at lower engine speed positions. The cable passes through a flexible sheath and extends through the fire wall and through the automobile dash panel and the driver's compartment where it has affixed thereto a cable knob. When the cable knob is pulled away from the dash panel the cable pulls the stop into abutment with the accelerator control arm taking up the lost motion and then moves the arm in a direction so as to reduce the engine speed.

In normal use the application of pressure to the accelerator pedal causes the accelerator control linkage to move in a direction so that a force is applied to the force transmission spring. Since the force transmission spring is stronger than the return spring it does not elastically deform to an appreciable extent and moves the accelerator control arm in a direction to increase the engine speed. As this is happening the return spring proportionally elastically deforms and stores up energy.

If the accelerator control linkage should stick, pulling on the cable knob causes the cable to be moved so that the lost motion between the stop and accelerator control arm is taken up with the stop abutting and applying pressure on the accelerator control arm. Continued pulling on the cable knob causes the cable stop to move the accelerator control arm in the direction of reducing the engine speed. This causes a force to be applied to the force transmission spring, such force being in a direction opposite to the direction of the force for increasing engine speed so that said spring elastically deforms as the accelerator control arm is moved toward its engine idling position with the return spring correspondingly deforming and yielding energy. If the accelerator control linkage is not too severely stuck the reverse force applied to the force transmission spring and linkage will move the accelerator control linkage back to its engine idling operating position. The force transmission spring is weak enough to be elastically deformed by the force applied by an operator to the control knob.

Even if the accelerator control linkage is tightly stuck, the position of the accelerator control arm can be varied by appropriately changing the position of the cable knob. As an example, the cable knob can be moved so that the cable abutment lessens its pressure against the accelerator control arm. When this happens the energy stored up in the elastically deformed force transmission spring pulls the accelerator control arm away from idle position to increase the speed of the engine. As this is happening the force transmission spring progressively returns toward undeformed condition. By further appropriately manipulating the cable knob it can be seen that the position of the accelerator control arm can be varied at will even though the accelerator control linkage is stuck.

In another embodiment of the present invention a system is disclosed wherein the application of pressure to the brake pedal causes the accelerator control arm to be moved to the engine idling operating position even if the accelerator control linkage is stuck. This feature of the present invention prevents the engine operating at higher than idling speed when the vehicles brakes are applied. In a similar manner if the vehicle operator were to hold the accelerator pedal depressed the application of the brakes would cause the accelerator control arm to come to the engine idling position.

The foregoing and various other objects and advantages of my invention will become apparent to the reader in the following description.

My invention accordingly consists in the features of construction, combinations of elements and arrangements of parts which will be exemplified in the devices hereinafter described and of which the scope of application will be indicated in the appended claims.

BRIEF DESCRIPTION OF THE DRAWINGS

In the drawings wherein like parts in the different FIGS. are identified by the same reference numerals.

DESCRIPTION OF THE PREFERRED EMBODIMENTS

Figure 1:
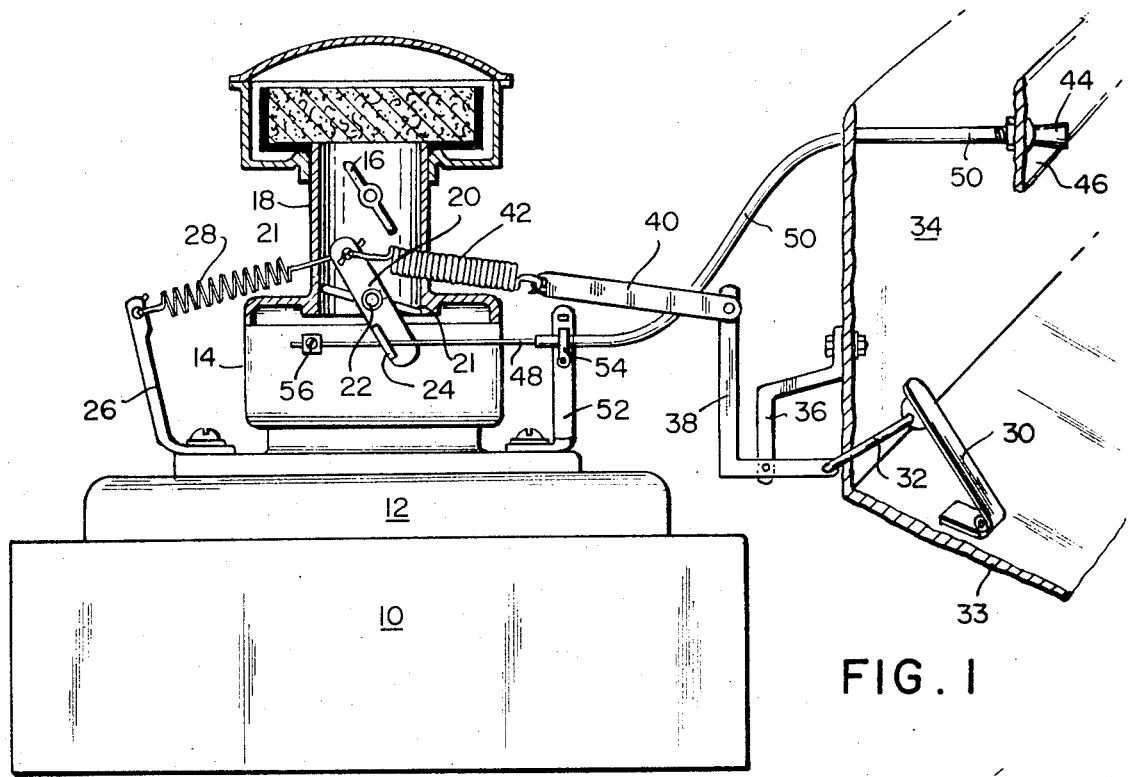
FIG. 1 is a schematic partially broken illustration of an embodiment of the present invention.

In FIG. 1 of the drawings a system according to the present invention is schematically shown for controlling the operating speed of an internal combustion engine 10 even if the accelerator control linkage therefor becomes stuck. It is to be understood that internal combustion engine 10 is mounted in a vehicle but that the vehicle has not been shown in the FIGS. since any conventional vehicle could be used and the specific type of vehicle in no way forms a part of my present invention. Also the specific type of engine is of no significance in the practice of my invention. Internal combustion engine 10 includes an intake manifold 12 as is conventional and located thereon is the carburetor mechanism 14. Carburetor mechanism 14 includes a choke butterfly valve 16 mounted in the carburetor neck 18.

An accelerator control arm 20 having a butterfly 21 is secured to the carburetor as is conventional and is pivotal about a pivot point 22 which may be defined by any conventional structure. Rotation of the control arm in a clockwise direction results in the speed of rotation of internal combustion engine 10 increasing as is conventional. Counter clockwise rotation of control arm 20 decreases the rotational speed of internal combustion engine 10 and maximum counter clockwise rotation of the arm results in internal combustion engine 10 being placed in an idle condition. Control arm 20 includes a slotted tab 24 at its bottom most portion for a reason that will soon be apparent.

A bracket 26 is secured to the top of the intake manifold and an accelerator return coil spring 28 has one end attached to the upper most portion of the bracket. The other end of accelerator return spring 28 is secured to the upper portion of accelerator control arm 20 and said spring is always under a slight tension so as to urge the arm to rotate in a counter clockwise direction toward a position corresponding to engine idling speed.

A pivoted accelerator foot pedal 30 is shown and secured thereto is a rod 32 which extends through fire wall 34. A Z-shaped bracket 36 is secured to the engine side of fire wall 34 and pivotally affixed to the lower portion of bracket 36 is a bell crank lever 38. Secured to one end of lever 38 is rod 32. A rigid rod 40 is pivotally secured to the other end of link 38 and secured to the other end of rod 40 is a close-wound force transmitting tension coil spring 42. Spring 42 is also fastened to the upper portion of arm 20 and this can be done at the same location on the arm where spring 28 is secured thereto. Spring 42 is substantially stronger than spring 28, but is sufficiently weak to be stretched manually, and functions in a manner that will hereinafter be described.

An emergency control knob 44 is located on the driver side of dash panel 46 and is secured to a cable 48 which is axially shiftable within a flexible sheathing 50. Sheathing 50 is fixed to dash panel 46 and cable 48 passes through fire wall 34 and the free end of the sheathing is held against axial movement by a clamp 54 which is mounted on a bracket 52 that is secured to manifold 12. Cable 48 extends beyond the end of sheathing 50 secured by clamp 54 and passes through slot 24 in the accelerator control arm 20 and securely fastened at approximately the end of flexible cable 48 is a cable stop 56. In the idle position of accelerator control arm 20 which is shown in FIG. 1 cable stop 56 is spaced from accelerator control arm 20 by the segment of cable which extends through slot 24 to allow the accelerator control arm to move freely through its entire range of travel upon the vehicle operator applying pressure on the accelerator pedal.

In normal operation the vehicle driver depresses accelerator pedal 30 causing a portion of rod 32 to move through fire wall 34. This causes lever 38 to rotate in a clockwise direction pulling rod 40 to the right. As a result a tensile force is applied to spring 42 which stays in its closely-wound condition and applies a force to accelerator control arm 20 rotating it clockwise increasing the operating speed of engine 10. Spring 28 stretches as a result of the clockwise rotation of accelerator control arm 20. Spring 42 does not expand appreciably, if at all, during this operation.

If for some reason the accelerator control linkage should stick with control arm 20 positioned so that engine 10 is operating faster than idling speed, knob 44 can be pulled to restore the accelerator control arm to its idling position. This occurs because the movement of knob 44 away from dash panel 46 pulls cable 48 through the slot 24 of accelerator control arm 20 bringing the cable stop 56 in contact with the accelerator control arm. The distance knob 44 must be moved from dash panel 46 for stop 56 to abut accelerator control arm 20 depends on the position of the accelerator control arm. Thus knob 44 will have to be moved further from dash panel 46 to bring cable stop 56 in contact with accelerator control arm 20 is the accelerator control arm is near its idling speed than if the accelerator control arm 20 is in a position causing the engine 10 to operate at higher than idling speed. In any event with knob 44 in the position seen in FIG. 1 a lost motion space always exists between cable stop 56 and accelerator control arm 20. Pulling on cable knob 44 causes cable stop 56 to move the accelerator control arm 20 in a counter clockwise direction expanding spring 42 and reducing the tension on the accelerator control arm return spring 28. As a consequence thereof the speed of engine 10 is decreased. Extended pulling on knob 44 results in accelerator control arm 20 being rotated to the engine's idling position. As has been mentioned previously spring 42, although stronger than return spring 28, is weak enough to yield under the force exerted by the operator pulling on knob 44.

The pulling on knob 44 without expansion of spring 42 may be sufficient to move the accelerator control linkage back to its motor idling speed operating position if the linkage is not frozen too tightly. Of course, if the linkage is tightly frozen then it will not be moved back to its motor idle position as a result of pulling on knob 44 but the spring 42 will yield.

With the accelerator linkage frozen it is still possible to drive the car by appropriately manipulating control knob 44. More specifically, if the cable control knob 44 has been pulled away from dashboard panel 46 moving cable 48 so that cable stop 56 is in abutment with the control arm which is in its motor idling position, spring 42 will be expanded. Movement of control knob 44 towards dashboard panel 46 causes cable 48 to retract causing cable stop 56 to no longer be tightly held against accelerator control arm 20 and spring 42 which was expanded contracts rotating accelerator control arm 20 in a clockwise direction stretching spring 28 until the accelerator control arm moves the distance allowed by the position of the cable stop. As a result, the speed of engine 10 will be increased above its idling speed and the vehicle is placed in motion if the vehicle's shift lever is in a driving position. Further movement of control knob 44 towards dashboard panel 46 similarly results in more clockwise rotation of accelerator control arm 20 with corresponding increases in the engine speed. If it is then desired to reduce the engine speed, knob 44 is pulled away from the dashboard panel with the result that cable stop 56 causes accelerator control arm 20 to rotate in a counter clockwise direction increasing the amount spring 42 is expanded and reducing the stretching of return spring 28.

Thus by varying the position of cable knob 44 relative to the dash panel 46 the speed of operation of engine 10 is controlled whereby the vehicle can be driven to a service facility for repair even if the accelerator control linkage is frozen.

Figure 2:
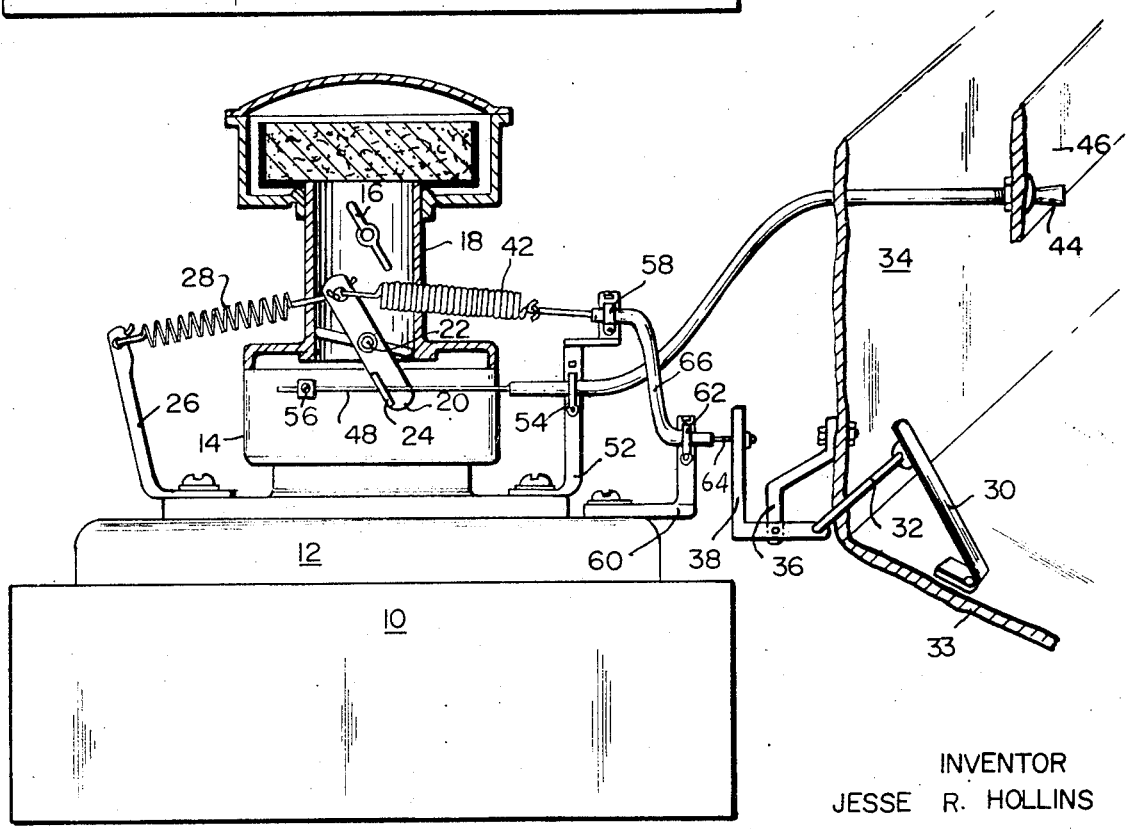
FIG. 2 is a schematic partially broken illustration of a modification of embodiment shown in FIG. 1.

In the embodiment of the invention shown in FIG. 2 bracket 52 has been extended and a second clamp 58 is attached thereto. A bracket 60 is mounted on the intake manifold and located on the top thereof is a clamp 62. An axially shiftable cable 64 at one end is secured to the most elevated portion of lever 38 and passes through a flexible sheath 66 which is secured against axial movement by clamps 62 and 58. Cable 64 extends past sheath 66 and clamp 58 and is secured to closely-wound spring 42. The embodiment of the invention as just described works in the same manner as that described in FIG. 1 except that flexible cable 64 connects spring 42 to link 38 instead of rigid rod 40 as shown in FIG. 1.

Figure 3:
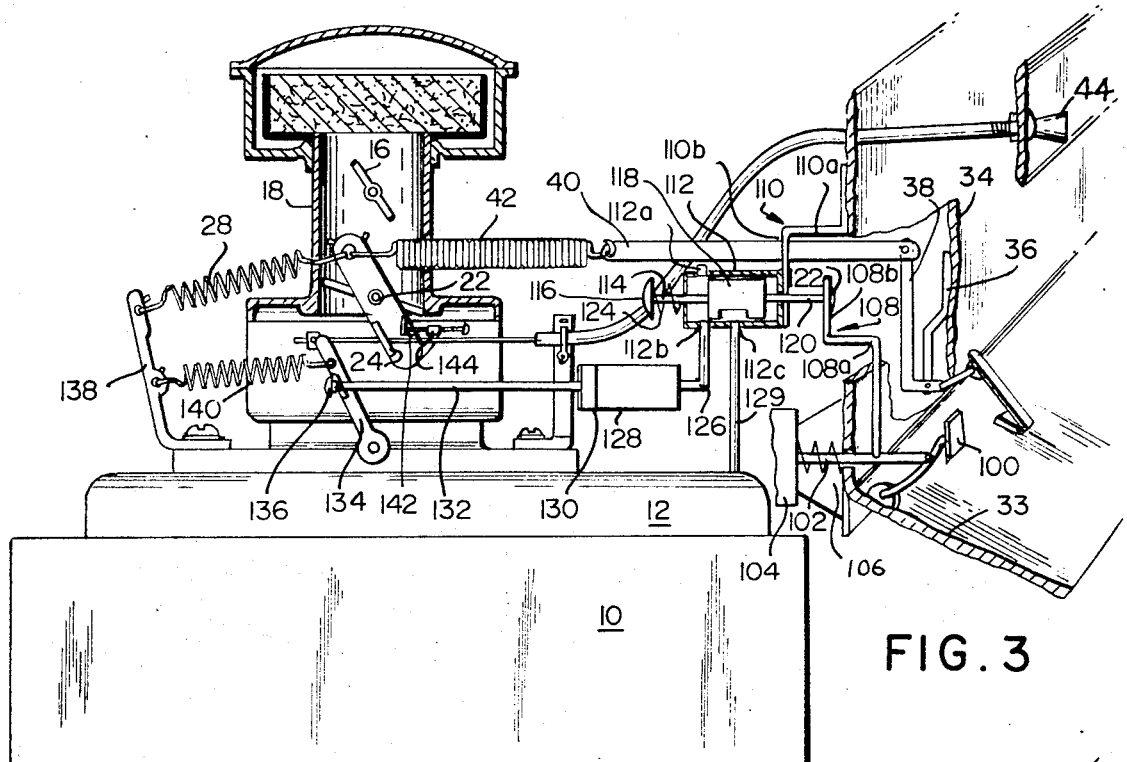
FIG. 3 is a schematic partially broken illustration of an alternate embodiment of the present invention.

The embodiment of the invention shown in FIG. 3 is designed so as to be capable, even with a stuck accelerator control linkage, of automatically controlling the position of the accelerator control arm and returns the control arm to an idle position when the vehicle brakes are applied. A foot brake pedal and arm 100 are pivotally fixed to floor 33 and movable therewith is a rod 102. Rod 102 extends through fire wall 34 and controls the operation of the brake system of the vehicle and this is accomplished by controlling the discharge of fluid from the master cylinder 104 to the wheel brake cylinders as is conventional. While a vacuum booster 106 is schematically shown in the drawings it is to be understood that this is for illustrative purposes only and the vacuum booster could be eliminated if desired and a master cylinder alone could be used.

Movable with brake pedal and arm 100 is a Z-shaped link 108 which includes three sections with the middle section 108a extending through the fire wall and an upright section 108b on the engine side of the fire wall and parallel thereto. A bracket 110 is affixed to fire wall 34 on the engine side thereof and includes a horizontal section 110a and a vertical section 110b depending from the free end of horizontal section 110a. Section 108b of link 108 and vertical section 110b of bracket 110 are in partial registry with each section including an opening. These openings are in registry.

A valve sleeve 112 is affixed to vertical section 110b of bracket 110 and includes an opening at the right side thereof which is in registry with the opening in vertical section 110b. An opening extends through the left end of sleeve 112 and is in registry with the opening on the right end thereof. A post 114 extends through the opening in the left end of sleeve 112 and an abutment member 116 is at the left end thereof. Secured to post 114 in sleeve 112 is a valve spool 118 and secured to the right end of valve spool 118 is a post 120 which extends through the opening in the right end of sleeve 112 and through the openings in vertical section 110b and in section 108b of link 108. Affixed to the free end of post 120 is an abutment member 122 which is normally in contact with the surface of section 108b of link 108 that faces fire wall 34. A compression coil spring 124 surrounds post 114 outside sleeve 112 and has one end in contact with abutment member 116 and the other end in contact with the left end of sleeve 112.

Sleeve 112 includes a vent port 112a which is in communication with the ambient air. Sleeve 112 also includes a port 112b which is connected via a tubing conduit 126 to the right end of a single acting pneumatic motor which includes a cylinder 128. A further port 112c is located in sleeve 112 and is in continuous communication with the engine intake manifold 12 via tubing conduit 129. Valve spool 118 is a conventional three-way valve as will be apparent to those skilled in the art.

A piston 130 is located in cylinder 128 and has a rod 132 extending through an opening in the left end thereof. The left end of the cylinder is in communication with ambient air as a result of the fact that the opening therein is substantially larger in cross-section than rod 132. Instead of having the opening of the left end of cylinder 128 larger than the rod a relief port may be used. A lever 134 is pivotally secured to the carburetor and includes a slot through which piston rod 132 extends. A stop 136 is affixed to the free end of piston rod 132 adjacent lever 134 and is in contact with the lever. An L-shaped bracket 138 is affixed to the top of the intake manifold and secured to the upright portion of the bracket is a tension coil spring 140 which biases lever 134 to the position seen in FIG. 3, to wit, the position corresponding to the left most orientation of piston 130 in cylinder 128. Affixed to the upper portion of bracket 138 is the accelerator control arm return spring 28.

Spring 28 is affixed to the accelerator control arm 20 as previously described and the accelerator control linkage for rotating the control arm is as previously described in FIG. 1. It is of course to be appreciated that while parts 38, 40 and 42 disclosed in FIG. 1 have been shown in detail in FIG. 3 the corresponding parts disclosed in FIG. 2 could be equally well used in the embodiment of the invention in FIG. 3.

A stop 142 is affixed to the bottom of accelerator control arm 20 and includes an adjusting means 144 which may be conventional for moving the stop relative to the accelerator control arm in a horizontal direction. Lever 134 and stop 142 are in the same vertical plane for a reason that will soon be readily apparent and lever 134 is spaced from stop 142 except as hereinafter described.

If no pressure is applied to the foot brake pedal, piston 130 will be in the position seen in FIG. 3, that is to say, in the left most portion of cylinder 128 as a result of the bias of spring 140 with cylinder 128 connected to ambient air by valve spool 118.

In normal operation with the accelerator control pedal depressed the application of the brake pedal causes upright section 108b to move to the left. Consequently, the bias of spring 124 against abutment member 116 causes valve spool 118 to move to the left. Cylinder 128 which was previously in communication with the atmosphere via vent port 112a, port 112b and tubing conduit 126 is now placed in communication with the intake manifold via port 112b, valve spool 118, port 112c and tubing conduits 129 and 126. Consequently, piston 130 and rod 132 move to the right, moving lever 134 in a clockwise direction and stretching spring 140. The lever moves since stop 136 is in contact therewith. Sufficient movement of lever 134 in a clockwise direction takes up the lost motion space between lever 134 and stop 142 and brings lever 134 into abutment with stop 142 rotating the accelerator control arm in a counter clockwise direction so that the speed of operation of engine 10 is reduced. A sufficient amount of rotation in a counter clockwise direction of arm 20 results in the engine being returned to its idling operation position. Assuming that the driver holds the accelerator pedal while he applies the brakes the operation of vacuum piston 130 and its rod through lever arm 134 will apply pressure on the accelerator control arm, causing the accelerator spring 42 to expand and returning accelerator control arm to its idling operating position.

The release of pressure on the brake pedal places the right portion of cylinder 128 in communication with ambient air allowing spring 140 to rotate lever 134 in a counter clockwise direction and pulling piston rod 132 to its left most position. Spring 28 returns accelerator control arm 20 to its idle position if the accelerator pedal is no longer depressed.

The cooperation of the accelerator control linkage with the accelerator control arm is as previously described.

If for some reason the accelerator control linkage is frozen, the movement of piston rod 132 to the right resulting from the depression of the foot brake pedal causes lever 134 to abut stop 142 and rotate accelerator control arm 20 in a counter clockwise direction. This causes spring 42 to be expanded and the expanding of spring 28 to be reduced while the control arm is returned to its idling operating position.

It is thus readily apparent that a system is provided wherein the application of pressure to the brake pedal brings the speed of rotation of the engine to the idling operation position to prevent the hazardous conditions described in my above noted patent. It is to be appreciated that the manual control means for regulating the position of the accelerator control arm can be utilized as previously described and thus by the judicious use of the manual means of operating the accelerator control arm the vehicle can be operated even though the accelerator linkage is frozen.

Figure 4:
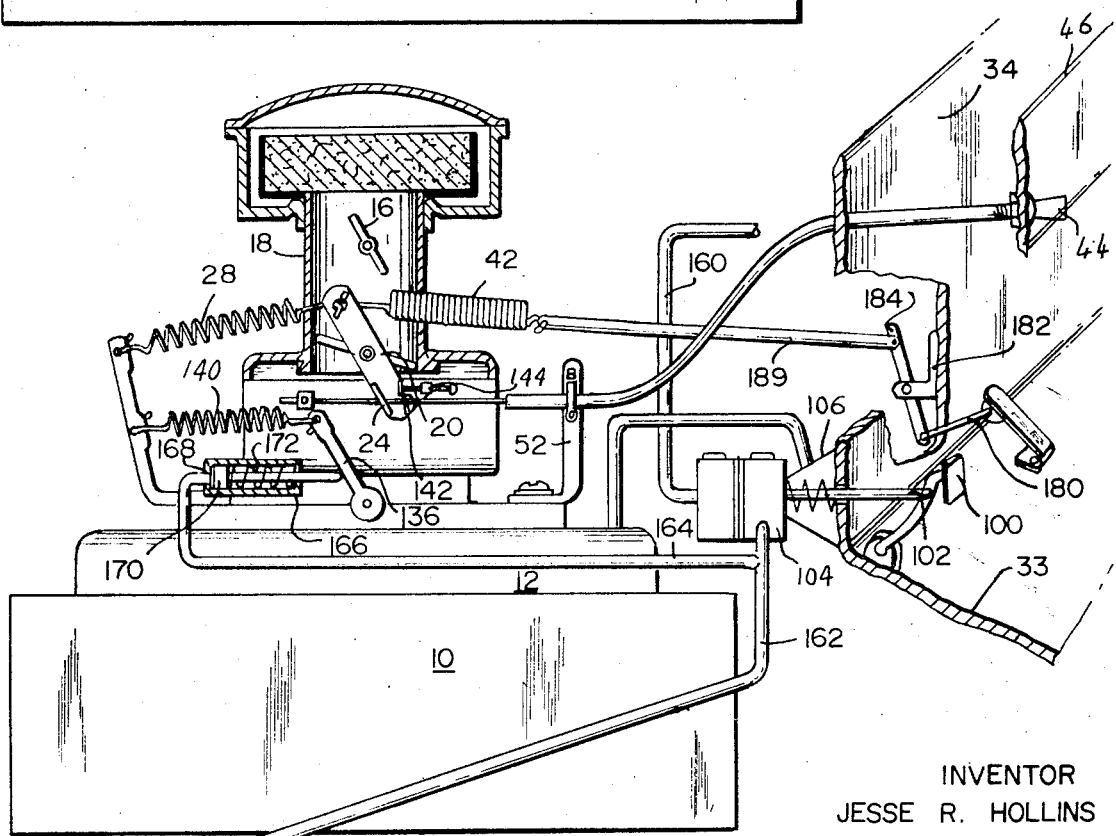
FIG. 4 is a schematic partially broken illustration of a still further embodiment of the present invention.

In FIG. 4 of the drawings a further embodiment of the present invention is shown wherein the means for controlling the position of the accelerator control arm is operated by the hydraulic pressure in the brake line instead of sub-atmospheric pressure from the intake manifold. Foot brake pedal 100 controls the operation of master cylinder 104 which may have a vacuum booster 106 if desired as shown in FIG. 4. A line 160 leads from master cylinder 104 to the brake cylinders of the rear wheels while a line 162 leads from the master cylinder unit to the brake cylinders of the front wheels. In parallel with line 162 is a line 164 which leads to a single acting fluid motor 166. Single acting motor 166 includes a cylinder 168 housing a piston 170 the rod of which projects through the right end of the cylinder and contacts lever 134. A spring 172 biases the piston to the position seen in FIG. 4 and the right portion of the cylinder is in communication with ambient air as a result of an enlarged opening in the right end of cylinder 166 through which the rod passes. Instead of having an enlarged opening in the right end of cylinder 166 a relief port may be used.

Connected to the accelerator control pedal is a rod 180 which extends through fire wall 34. An L-shaped bracket 182 is secured to the engine side of fire wall 34. A lever 184 is pivotally affixed intermediate its end to the shorter leg of L-shaped bracket 182 and is pivotally affixed at one end to the end of rod 180 which is not affixed to the accelerator control pedal. Secured to the upper end of lever 184 is a rod 189 and secured to the other end of rob 186 is a closely-wound spring 42.

The means for controlling the position of the accelerator control arm when the accelerator control linkage is frozen is as previously described.

The application of pressure to the brake pedal with the accelerator pedal depressed or the accelerator linkage frozen in an above-idling condition results in pressure being directed to line 162 and line 164 causing piston 170 to move to the right against the bias of spring 172. The movement of the piston to the right causes lever 134, after taking up the lost motion between it and stop 142, to abut said stop causing accelerator control lever 20 to rotate in a counterclockwise direction. Consequently, accelerator spring 42 is expanded allowing the engine to return to its idling operation position while spring 28 is contracted.

Figure 5:
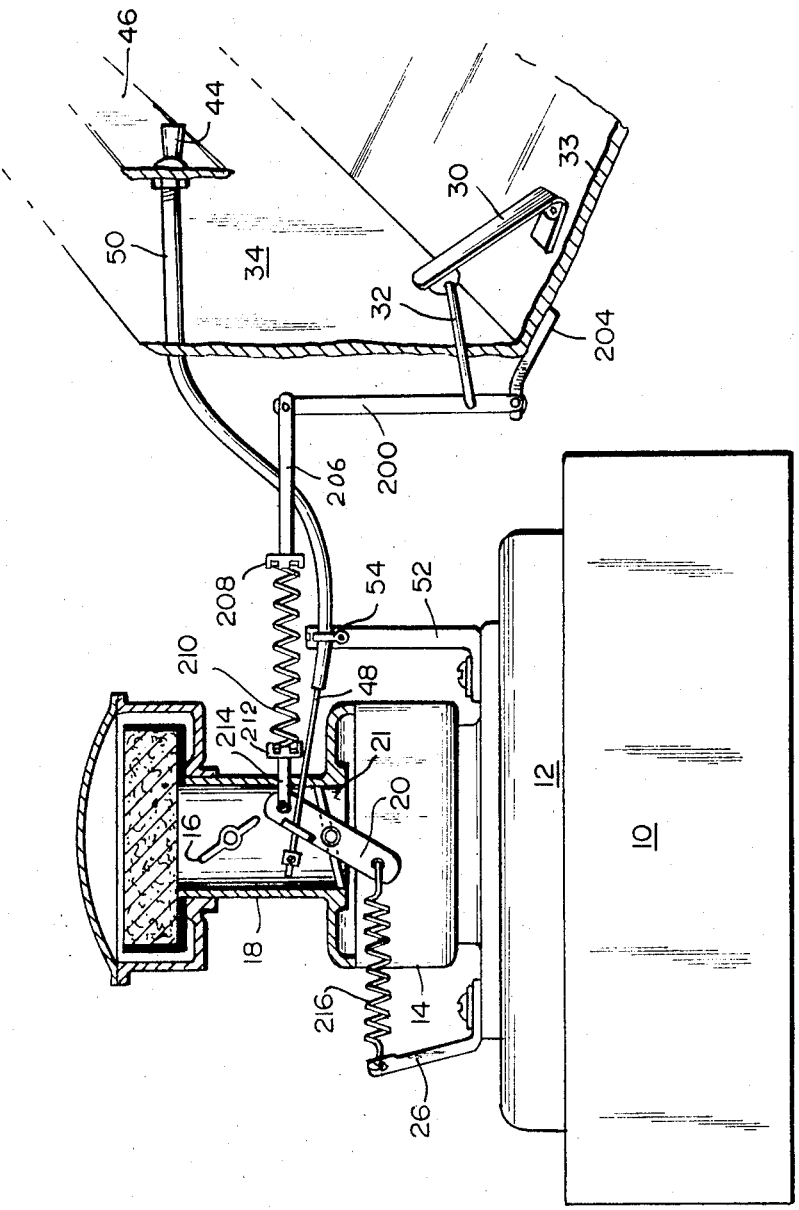
FIG. 5 is a schematic partially broken illustration of yet another modification of the present invention.

In FIG. 5 of the drawings a still further embodiment of the present invention is shown. Connected to accelerator pedal 30 and movable therewith is rod 32 that extends through fire wall 34 and is pivotally connected to a link 200 intermediate its ends. Link 200 is pivotally secured at one end to bracket 204 which is affixed to the vehicle frame. Secured to the top of link 200 is a link 206 and affixed to the left end of link 206 is a cap 208.

A stiff compression coil spring 210 has one end secured in cap 208 and the other end secured in a second cap 212. A link 214 is fixed to cap 212 at one end and at its other end and at its other end pivoted to the upper portion of accelerator control arm 20. An expansion return coil spring 216 has one end pivotally secured to the lower most portion of accelerator control arm 20 and the other end anchored to bracket 26 which is fixed on engine intake manifold 12. Spring 216 is always under tension and biases accelerator control 20 to an idle position. Spring 210 is appreciably stronger than spring 216 for a reason that will soon be apparent.

The application of pressure to accelerator pedal 30 causes link 206 to be moved to the left applying a compressive force to spring 210. Spring 210 does not appreciably compress, being substantially stronger than spring 216, and therefore applies a force to link 214 sufficient to move accelerator control arm 20 in a counter clockwise direction increasing the operating speed of internal combustion engine.

It is to be appreciated that in this embodiment of the invention counter clockwise rotation of accelerator control arm 20 increases the speed of operation of the internal combustion engine whereas in the previously described embodiments the opposite is true. As will be apparent to any skilled person in the art provisions can be made so that either clockwise or counter clockwise rotation of accelerator control arm 20 results in increasing the operating speed of its associated internal combustion engine. Counter clockwise rotation of accelerator control arm 20 results in spring 216 being stretched. If pressure is no longer applied to the accelerator pedal spring 216 will pull on the bottom of accelerator control arm 20 rotating the arm in a clockwise direction bringing the engine to an idle condition. When this happens link 214 will be moved to the right and compression spring 210 will move to the right while restoring accelerator pedal 30 to its non-depressed position.

The manual control means for this embodiment of the invention is as before described except that the slot in accelerator control arm 20 is located above the pivot point therefor. Cable 48 extends through the slot and an abutment member 56 is affixed to the free end thereof.

If for some reason the accelerator control linkage, or arm 20, or pedal 30 should be stuck with the accelerator control arm in a position such that the engine is operating at a higher than idling speed, movement of knob 44 away from dash panel 46 causes a portion of cable 48 to move through the slot in accelerator control arm 20. Further movement of cable knob 44 away from dash panel 46 results in the abutment member 56 being pulled against accelerator control arm 20 and rotating the accelerator control arm in a clockwise direction so that the engine will be slowed down, ultimately to an idling operation position if knob 44 is pulled out far enough. The rotation of accelerator control arm 20 in a clockwise direction causes spring 210 to be compressed and spring 216 to become less stretched. If the accelerator control linkage is not too severely stuck the pulling on knob 44 may cause the accelerator control linkage to become unstuck and return to an engine idling speed position. By selectively varying the position of knob 44 it is possible to control the speed of operation of the internal combustion engine and hence the speed of the vehicle so that in an emergency the vehicle's speed can be controlled, albeit with considerable less facility than by use of pedal 30.

It is to be appreciated that the embodiments of the invention hereindescribed are reliable in operation and can be incorporated in the production of the engine speed control mechanisms of an engine with a minimum of cost and with a maximum of reliability.

If for some reason the spring in the accelerator control linkage breaks or becomes disengaged the manually operated cable assembly can be operated to control the position of the accelerator control arm. More specifically, this can be done by utilizing the cable to rotate the accelerator control arm as required against the bias of the accelerator control arm return spring.

It is to be noted that the spring in the accelerator control linkage must have a low enough spring constant to be expandable or contractible, as the case may be, when cable 44, or the cylinder and piston assembly, applies pressure on the accelerator control arm.

As various possible embodiments might be made of the above invention and as various changes might be made in the embodiments set forth, it is to be understood that all matter herein described or shown in the accompanying drawings is to be interpreted as illustrative and not in a limiting sense.

Having thus described the invention, there is claimed as new and is desired to be secured by Letters Patent:

1. A system for controlling the position of an accelerator control element for an engine the rotational speed of which is normally controlled by an operator control member comprising an accelerator control element for controlling the rotational speed of an engine, first biasing means for biasing said accelerator control element to an engine idle position, an operator control member, an accelerator control element linkage movable to selectively position the accelerator control element upon movement of the operator control member, means independent of said accelerator control element linkage for controlling the position of said accelerator control element when said accelerator control linkage is stuck, a second biasing means stronger than said first biasing means included in said accelerator control linkage and through which a force from the operator control member is transmitted to said accelerator control element, and said independent means including a kinematic train, said kinematic train arranged so as to move said accelerator control element against the bias of said second biasing means when said accelerator control linkage is stuck whereby the position of said accelerator control element may be selectively varied.

2. A system according to claim 1 wherein means is provided for allowing said kinematic train to move relative to said accelerator control element and for said accelerator control element and said kinematic train to move in unison.

3. A system according to claim 1, wherein said accelerator control element includes a slot, said kinematic train including a cable, said cable passing through said slot with a stop secured to a portion of said cable for preventing the cable from being completely pulled through said slot.

4. A system according to claim 1 wherein said accelerator control element linkage includes a flexible cable, said flexible cable secured to said second biasing means and said second biasing means secured to said accelerator control element.

5. A system according to claim 2 wherein said allowing means includes a lost motion between said kinematic train and said accelerator control element.

6. A system according to claim 1 further including a movable brake actuating member, a brake system, means for directing a source of energy to said brake system upon movement of said brake actuating member, a motor, a transmission means movable with said motor, said transmission means positioned so that upon being moved in a direction a sufficient amount a portion thereof contacts said accelerator control element and moves said element to an idle position, said motor connected to said brake system so that upon the movement of said brake actuating member energy is directed to said motor and said transmission means is moved in said direction.

7. A system according to claim 6, wherein said brake system is a hydraulic system with the movement of the brake actuating member resulting in the application of hydraulic pressure to the brake system, said motor being a hydraulic motor having a piston with a rod, said transmission means movable with said piston rod, said motor connected to said brake system with the application of hydraulic pressure to said brake system resulting in said piston rod moving in a direction so that said transmission means is placed into contact with said accelerator control element to move said accelerator control element to an idle position.

8. A system according to claim 7 wherein said transmission means includes a lever, said lever movable with said piston rod of said piston and into contact with said control element after a predetermined amount of movement of said piston.

9. A system according to claim 8 wherein means is provided for urging said lever, said piston rod and said piston to a position wherein said lever is out of contact with said accelerator control element.

10. A system according to claim 1, further including a movable brake actuating member having a brakes off position, a brake system, a source of energy, a motor, a movable motor control means, a transmission means movable with said motor, said transmission means positioned so that upon being moved in a direction a sufficient amount a portion thereof contacts said accelerator control element and moves said element to an idling speed operating position, said motor control means connected to the source of energy, means for moving the motor control means so that upon the movement of said brake actuating member away from the brakes off position said motor control means is moved to allow the source of energy to be directed to said motor so that said transmission means can move said accelerator control element to an idling speed operating position.

11. A system according to claim 10 wherein said motor control means is a valve, means connecting said valve to said motor, said source of energy being an intake manifold in the engine, said valve connected to said intake manifold, said valve having a vent port and connecting said vent port via said connecting means to the motor when said brake actuating member is in the brakes off position, and said motor to said intake manifold when the brake actuating member is not at the brakes off position.

12. A system according to claim 11 wherein said motor is a fluid motor, means biasing said motor to a position so that said transmission means is positioned away from said accelerator control element.

13. A system according to claim 12 wherein said fluid motor includes a cylinder, a piston having a rod housed therein with said rod extending through one portion of said cylinder, a lever, said transmission means constituting said piston rod and the lever, said lever movable with said piston rod and said control element movable with said lever upon said piston being moved more than a predetermined amount due to said valve via said connecting means connecting said cylinder to said intake manifold.

14. A system according to claim 13 wherein means is provided for maintaining said valve in a position so that said cylinder is connected to said vent port when said brake actuating member is in the brakes off position.

15. A system according to claim 1 wherein said first biasing means is a tension spring.

16. A system according to claim 1 wherein said second biasing means is a tension spring.

* * * * *